350/358

4,355,869

United States Patent [19]

Yao

[11] 4,355,869

[45] Oct. 26, 1982

[54] SELF SCANNED OPTICAL FOURIER TRANSFORM ARRANGEMENT

[75] Inventor: Shi-Kay Yao, Anaheim, Calif.

[73] Assignee: Rockwell International Corporation, El Segundo, Calif.

[21] Appl. No.: 154,246

[22] Filed: May 29, 1980

[51] Int. Cl.³ .................... G02F 1/11

[52] U.S. Cl. .................... 350/358

[58] Field of Search .................... 350/358, 96.13

[56] References Cited

U.S. PATENT DOCUMENTS 3,483,387 12/1969 Davis, Jr. .................... 350/358

3,539,245 11/1970 Brienza .................... 350/358

*Primary Examiner*—William L. Sikes

*Attorney, Agent, or Firm*—H. Fredrick Hamann; Daniel R. McGlynn

[57] ABSTRACT

An optical system including a radio frequency signal input; a chirp signal input; a source for emitting a beam of radiation; an acousto-optical modulator disposed in the path of the beam and functioning to modulate the beam with the radio frequency signal and the chirp signal to produce a modulated beam; and a single detector disposed in the path of the third modulated beam. The inventor further provides electronic alignment and focusing by changing the chirp frequency.

7 Claims, 4 Drawing Figures

SELF SCANNED OPTICAL FOURIER TRANSFORM ARRANGEMENT

CROSS REFERENCE TO RELATED APPLICATIONS

This application is related to the concurrently filed and copending U.S. patent applications Ser. Nos. 154,358 and 154,359, assigned to the assignee of the present application.

BACKGROUND OF THE INVENTION

1. Field of the Invention

The invention relates to optical systems, and more particularly to an arrangement of optical elements for performing a Fourier transform by optical means.

2. Description of Prior Art

The use of optical element for simple, coherent optical signal processing is well known in the art. Processing functions such as matrix multiplications, Fourier transform, and convolutions can be performed using coherent optical processing. Such systems have been constructed from bulk three dimensional elements such as lenses, bulk modulators, and two dimensional detector arrays. Another important application is the spectral analysis of RF signals.

An optical RF spectrum analyzer described in the prior art employs the interaction between a coherent optical wave and an acoustic wave driven by an input electrical signal to determine the power spectral density of the input. Such an analyzer may be implemented in an integrated optics version, and is described in the article "Integrated Optic Spectrum Analyzer", M. K. Barnowski, B. Chen, T. R. Joseph, J. Y. Lee, and O. G. Rama, IEEE Trans. on Circuits and Systems, Vol. CAS-26, No. 12, Dec. 1979. The integrated optics version consists of an injection laser diode, a thin-film optical waveguide, waveguide lens, a surface acoustic wave transducer, and a linear detector array. The unit operates by mixing an incoming radar signal with a local oscillator such that the intermediate frequency is within the pass band of the transducer. After amplification, the signal is applied to the SAW transducer. The resulting surface acoustic waves traversing the optical waveguide generate a periodic modulation of the refractive index of the waveguide mode. If the culminated optical beam intersects the acoustic beam at the Bragg angle, a portion of the beam will be defracted or deflected at an angle closely proportional to the acoustic frequency with intensity proportional to the power level of the input signal. The Bragg detector light is then focused on an array of focal plane detectors where each detector output becomes one frequency channel of the spectrum analyzer. Such systems are limited by the size, spacing, and number of detector elements, which all effect the exactness of the Fourier transform which is computed, and which is used in determining the intensity or other characteristics of the incoming signal.

Although the acousto-optical Fourier transform device is an important approach to RF spectrum analysis in electromagnetically dense environment, the chance of success in the prior art integrated optical devices depends upon whether a simple configuration with fine trimming capability in optical alignment can be found.

Prior to the present invention, there has not been suitable means for optical alignment of such devices.

SUMMARY OF THE INVENTION

Briefly, and in general terms, the invention provides an optical system including a source of emitting a beam of radiation; acoustic-optical modulation means disposed in the path of said beam and functioning to modulate said beam with predetermined signals to produce a modulated beam; Fourier transfer lens means disposed in the path of said two modulated beams; and a single detector disposed in the path of the modulated beam.

An important feature of the present invention is the use of a single detector rather than an array such as known in the prior art. Since the beam is a moving one, that is the beam is continually displaced in a direction normal to the direction of optical propagation by virtue of the acousto-optical modulation means chirp function, the information content contained in the beam would be exposed to a single detector which is kept in the path of the beam.

Another feature of the present invention is to provide adjustment means for adjusting the frequency modulation of the chirp signal. Since the frequency modulation of the chirp signal affects the focusing of the modulated beam, the alignment of the entire optical system may be performed electronically by adjusting the frequency modulation of the signal, rather than physically or optically by adjusting the placement of the optical components. Such electronic means for optical alignment of an optical system permits a fine trimming capability not found in the prior art.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF THE PREFERRED EMBODIMENT

Figure 1A:
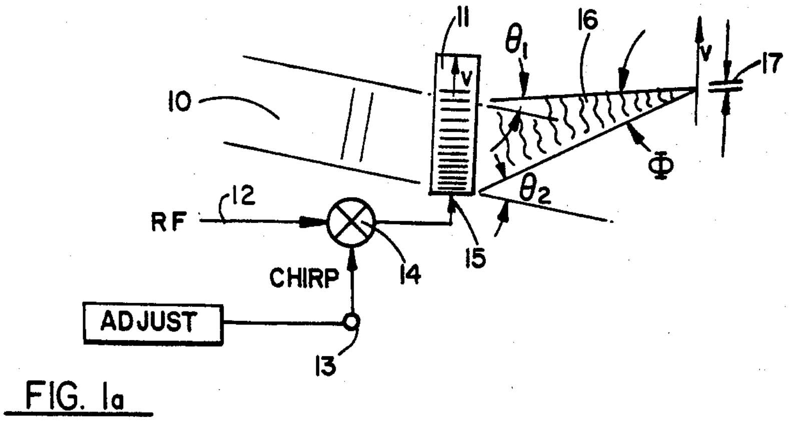
FIG. 1*a* and 1*b* are first embodiments of the present invention using an acoustic optical modulator for a real-time Fourier transform.
Figure 1B:
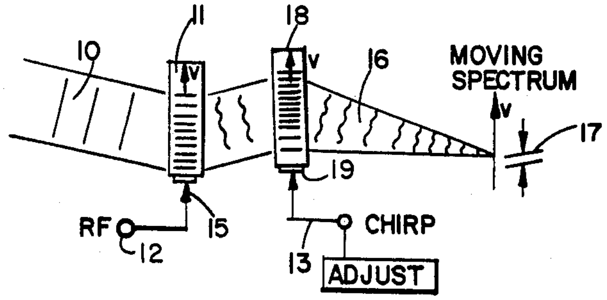

FIGS. 1*a* and 1*b* are embodiments of the present invention using an acoustic optic modulator for performing a real-time Fourier transform. On the left hand side of the figure is shown a laser beam 10 which is directed to an acousto-optical spatial modulator 11. Acousto-optical spatial modulators 11 are available from such firms as Isomet, Crystal Technology, Harris, and Itek and are well known to those skilled in the optical art. The input 15 of the acousto-optical modulator is driven in a novel way according to the present invention. An RF input signal 12 is combined with a chirp signal 13 in a mixer 14. The mixer functions to combine the RF signal and the chirp signal to produce a modulating signal which travels in the acousto-optical modulator. The chirp signal is a substantially linear frequency modulated signal having a constant amplitude. The purpose of the acousto-optical modulator 11 is to modulate the beam 10 to form a new focused beam 16 which converges at a focal point or plane at which is placed a single detector 17. Since the signal on the acousto-optical lens travels at the speed of sound in the solid medium, the optical beam 16 also travels at the same speed v in a direction normal to the direction of optical propagation. This affect creates a self-scanning of the beam on the detector 17. Thus the information contained in the beam would be exposed to the single detector which lies in the focal plane of the acousto-optical modulator or lens 11.

Another feature of the present invention is to provide focusing adjustment of the beam to more accurately align the system. This is done by means of adjustment of the frequency modulator of the chirp signal 13 as shown in the figure.

FIG. 1*b* is an alternative configuration of the acousto-optical modulator for performing a real-time Fourier transform shown in FIG. 1*a*. In this case a second acousto-optical modulator 18 is used so that the combination of the RF signal and the chirp signal is performed optically rather than electronically. The first acousto-optical modulator 11 has its input 15 connected directly to the RF signal input 12. The second acousto-optical modulator 18 has its input 19 connected to the chirp signal input 13. Again a modulated optic beam is produced 16 which is focused on a single detector 17.

Figure 2:
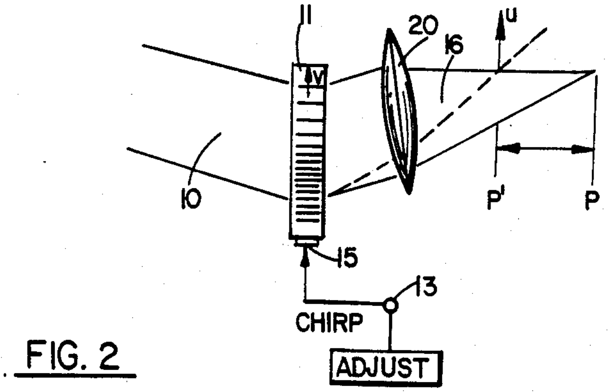
FIG. 2 is another implementation of the present invention illustrating the focus adjustment according to the present invention.

FIG. 2 is another implementation of the present invention illustrating the use of a Fourier lens 20 in focusing the beam. Again the laser beam 10 is applied to acousto-optical modulator 11 which has an input 15 which is driven by a chirp signal 13. The modulated beam from the acousto-optical modulator is applied to a Fourier transform lens 20 which produces a Fourier transform beam 16 which may focus on either plane p or plane p'. By adjusting the frequency of the chirp signal 13, the focus may be shifted from planes p' to p and vice versa.

Figure 3:
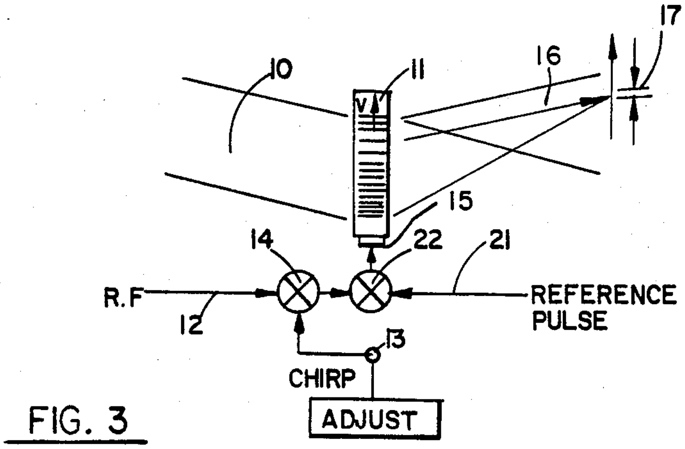
FIG. 3 is another implementation of the present invention for performing a heterodyne for computing the real Fourier transform.

Finally FIG. 3 is yet another embodiment of the present invention which performs a heterodyne for computing the rear Fourier transform. Again, the laser beam 10 is applied to acousto-optical modulator 11 which is driven by an input 15. Applied to the input 15, however, is a combination of an RF signal, a chirp signal, and a reference pulse. The combination of the technique is shown in the drawing. The RF signal 12 is combined with the chirp signal 13 by a first mixer 14 to produce a first modulating signal. The first modulating signal, together with a reference pulse 21, is then combined in a second mixer 22 which produces a second modulating signal which is directly applied to the input 15 of the acousto-optical modulator 11. The light beam passing through the acousto-signal modulator 11 becmes a modulated beam 16 which is then focused on a single detector 17 as has been described previously. Such an arrangement is useful for computing the real Fourier transformer.

In summary, using a linearly chirped acoustic signal, an electronic focusing element for optical systems becomes available. The optical system may use this phenomena for the replacement of Fourier transform lens. The traveling lens and input signal result in a traveling Fourier transform spectrum, which allows a serial read-out of the spectrum with only one stationary photodetector. One feature is the use of the electronic chirp to adjust the focal length of an optical system. Moreover, the idea of heterodyne detection for real Fourier transform is also possible, which may be applied to image processing. The heterodyne scheme also provides greater dynamic range since the scattered background light from the input optical beam and unused diffraction orders are biased with high carrier frequency and will be averaged out.

The advantages are (1) a simple photodetector technique, (2) electro-optical alignment, and (3) greater dynamic range than in previous optical Fourier transform systems.

While the invention has been illustrated and described as embodied in a self-scanned Fourier transform system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitutes essential characteristics of the generic or specific aspects of this invention and, therefore, such adaptations should and are intended to be comprehended within the meaning and range of equivalence of the following claims.

What is claimed is:

1. An optical system comprising:

input means for providing an information-containing input signal having a frequency in the RF portion of the spectrum;

chirp means for providing a linear frequency modulated signal with substantially constant amplitude;

mixing means connected to said input means and said chirp means for producing a modulating signal;

a source for emitting a beam of radiation;

accoustical optical modulation means disposed in the path of said beam, and connected to said input means and driven by said modulating signal, said modulation means functioning to modulate said beam with information derived from said input signal to produce a modulated travelling beam; and a single detector disposed in the path of said modulated beam for detecting the resulting optical intensity distribution at the focal point of said modulated beam, said resulting distribution representing a Fourier transform of said information containing input signal.

2. An optical system as defined in claim 1, wherein said modulated beam is a moving Fourier transform beam, said beam carrying information representing the Fourier transform of the input radio frequency signal.

3. An optical system as defined in claim 1, further comprising focusing means connected to said chirp means for adjusting the modulation of said chirp signal so that the focal plane of said modulated beam is aligned with said signal detector.

4. An optical system comprising:

input means for providing an information containing input signal having a frequency in the RF portion of the spectrum;

chirp means for providing a linear frequency modulated chirp signal with a substantially constant amplitude;

a source for emitting a beam of radiation;

first acousto-optical modulation means disposed in the path of said beam and functioning to modulate said beam with said RF signal to produce a first modulated beam;

second acousto-optical modulation means disposed in the path of said beam and functioning to modulate said beam with said chirp signal to produce a second modulated beam; and a single detector disposed in the path of said modulated beam for detecting the resulting optical intensity distribution at the focal point of said modulated beam, said resulting distribution representing a Fourier transform of said information containing input signal.

5. An optical system as defined in claim 4, wherein said source for emitting a beam of radiation is a laser.

6. An optical system as defined in claim 4, further comprising focusing means connected to said chirp means for adjusting the modulation of said chirp signal so that the focal plane of said modulated beam is aligned with single detector.

7. An optical system as defined in claim 4, wherein said modulated beam is a moving Fourier transform beam, said beam carrying information representing the Fourier transform of the input radio frequency signal.

* * * * *

UNITED STATES PATENT AND TRADEMARK OFFICE

CERTIFICATE OF CORRECTION

PATENT NO. : 4,355,869

DATED : October 26, 1982

INVENTOR(S) : Shi-Kay Yao

It is certified that error appears in the above-identified patent and that said Letters Patent are hereby corrected as shown below:

Column 1, line 19, please delete "element" and insert --elements--.

Column 3, line 42, please delete "rear" and insert --real--.

Column 3, line 55, please delete "becmes" and insert --becomes--.

Signed and Sealed this

*Twenty-second* Day of *February 1983*

[SEAL]

*Attest:*

GERALD J. MOSSINGHOFF

*Attesting Officer* — *Commissioner of Patents and Trademarks*